Patented Apr. 17, 1951

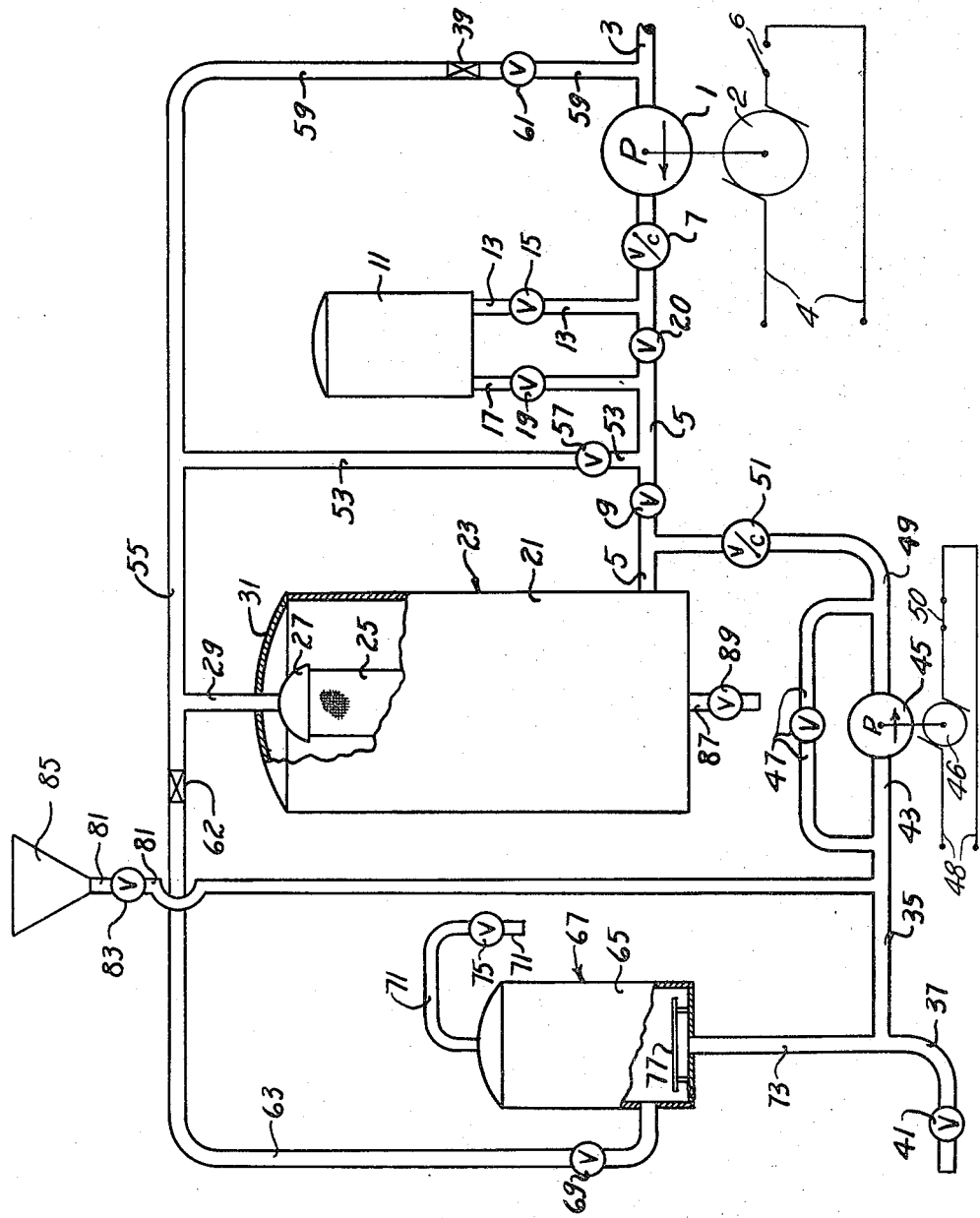

2,549,063

UNITED STATES PATENT OFFICE 2,549,063

LIQUID SEPARATION METHOD AND APPARATUS

La Vern H. De Haven, Fort Wayne, Ind., assignor to Bowser, Inc., Fort Wayne, Ind., a corporation of Indiana Application April 16, 1945, Serial No. 588,655

4 Claims. (Cl. 210—44)

This invention relates to a method and apparatus for separating one liquid from another. More specifically, it relates to the separation of two liquids by filtration through a cake of diatomaceous earth or other media where one of said liquids is dispersed as an emulsion in another liquid.

In the operation of modern high pressure and high speed reciprocating steam engines, the oils used to lubricate the pistons and valves of these engines is carried with the exhaust steam and appears as an emulsion in condensate flowing from the condensers connected to such engines. When the condensate is again introduced into steam generators it creates various problems.

It has been proposed to treat the condensate by passing it through a bed or cake of diatomaceous earth or similar material which serves, is believed, to coalesce the individual bits of emulsion into particles of oil which can then be readily separated by gravitation. In any case the emulsion is removed and the condensate becomes clear after passage through the filter. While numerous media have been tried for effecting this separation, such as, for instance, steel wool, bronze wool, aluminum wool, stainless steel wool and Monel wool in various grades, it has been found that each presents difficulties and cost factors which discourage their use. On the other hand, the use of diatomaceous earth, which will be hereinafter referred to as powder, has the advantage of being low in cost and easily applied.

However, a number of difficulties are encountered in its use and it is a major object of this invention to cure these difficulties.

The treatment has been applied to the condensate by passing the latter through a bed of powder. However, the powder shifts and channels due to the washing action of the flow of condensate and also with the motions of the container as in vehicular or marine applications. This causes the loss of a great deal of powder and inefficient operation. Further, the bed of powder eventually traps a quantity of oil or emulsion and loses its separating efficiency which is indicated by cloudiness of the effluent.

To overcome the shifting and channeling difficulties the usual screen type filter has been used, wherein a series of screens are mounted between the inlet and outlet of a filter so that the differential pressures applied on opposite sides of the screen and slurry of powder and water is circulated through the screen to build up a precoat or cake thereon. When the cake is established, raw condensate is then passed through it.

The difficulties encountered in the use of the screen type of filter are that the cake drops from the screen when the condensate pump is stopped, necessitating precoating before further operation can be had and the loading of the cake with oil or emulsion so that it loses its efficiency and permits emulsion to pass through it.

It is an object of the invention to provide a method and apparatus for retaining the precoat on the filter screens irrespective of the operation of the condensate pump.

It is a further object of the invention to provide a method and apparatus for reactivating the precoat after it loses its efficiency.

Yet another object of the invention is to provide means for maintaining a continuous flow of liquid through the filter to hold the cake on the screens.

Still another object is to provide means for passing an oil solvent through the cake on the screens to remove the oil and/or emulsion from the cake so as to restore its emulsion separating efficiency.

Further, it is an object of the invention to provide means for trapping oil, and solvent which is carried in the filtrate.

These and other objects will become apparent from a study of this specification and the drawings which are attached thereto and made a part thereof and in which the single figure is a schematic diagram illustrating the filtering separation, precoating and washing apparatus, and process.

Referring to the drawing, the numeral 1 designates a centrifugal or a positive displacement pump with a by-pass which is driven by motor 2 connected in power line 4 controlled by switch 6 having an inlet conduit 3 and an outlet conduit 5. A check valve 7 and a shut off valve 9 are inserted in the outlet conduit, the former to prevent a back flow through the pump and the latter to divert the liquid flow for backwashing, which will be disclosed later in this specification.

A slurry feeder 11 has an inlet 13 controlled by valve 15 leading from line 5 on the outlet side of pump 1 and an outlet conduit 17 controlled by valve 19 joining conduit 5 downstream from the inlet conduit 13. Both the inlet and outlet conduits connect with conduit 5 between the pump 1 and the valve 9. A throttle valve 20 is in conduit 5 between conduits 13 and 17.

The conduit 5 terminates in the case or shell 21 of filter 23. The filter may be of any of the types in which powder is supported as a cake on a pervious medium. A cylindrical screen type of element 25 is shown for purposes of illustration only. This element is provided with a head 27 which is connected to a conduit 29 extending through the filter head 31. Conduit 63 branches from conduit 29, is provided with a sight glass 62 and leads into the shell 65 of the separator 67. Shut-off valve 69 is located in conduit 63. Two outlet conduits 71 and 73 are provided at the top and bottom respectively of the separator, the former having shut-off valve 75 controlling the flow from the separator, while the flow into the latter conduit is deflected by baffle 77. Conduit 73 terminates in conduit 37 and a shut-off valve 41. Conduit 37 leads to a receptacle for the filtrate.

Conduit 35 is joined to conduit 73 and supplies a circulating pump 45, having a conventional by-pass 47, with filtrate. The motor 46 is connected in power line 48 controlled by switch 50 which is normally kept closed at all times. Conduit 49 connects the discharge of pump 45 with conduit 5 between the filter and valve 9. A check valve 51 is placed in conduit 49 to prevent a back flow through pump 45.

A back washing conduit 53 connects conduit 55, which joins conduit 29, to conduit 5 between valves 7 and 9. A shut-off valve 57 is provided in conduit 53. A precoating or circulating conduit 59 having a sight glass 39 and a shut-off valve 61 joins pump inlet conduit 3 and conduit 55.

A conduit 81 which is provided with a shut-off valve 83 connects a funnel 85 with conduit 35 so that solvent or other material can be introduced in the line.

A drain connection 87 with shut-off valve 89 is provided at the bottom of the filter shell 21.

*Operation*

In the preparing of the system for operation, it is necessary to precoat the filter. Precoating is accomplished with pump 1 in operation, valve 20 throttled, valves 9, 15, 19 and 61 open, and valves 57, 69 and 89 closed. The liquid is drawn by pump 1 through conduit 3 and discharged into conduit 5 through check valve 7. The degree of throttling of valve 20 determines the amount of liquid diverted through conduit 13 and valve 15 into the powder feeder 11 and also the amount of filter aid that is carried by the diverted liquid through conduit 17 and valve 19 into conduit 5 below valve 20. The liquid carries the filter aid through valve 9 and into shell 21 of the filter 23, filling the filter.

The liquid flows through the openings in the screen 25 and deposits the filter aid in an even cake over it. The liquid returns to the suction side of the pump by way of header 27, conduits 29, 55, 59, valve 61 and line 3, for recirculation until the desired precoat cake has been formed. This is usually indicated by the clarity of the filtrate which is observed in a sight glass such as 39.

With the completion of the precoating, valves 20, 69 and 41 are opened. Valves 15, 19 and 61 are closed while valves 57, 75 and 89 remain closed. Raw condensate is thus drawn from pipe 3, passed through pump 1, the cake on screen 25, out through conduit 29, sight glass 62, pipe 63, valve 69 into the separator, around baffle 77 to pipe 73 and thence through pipe 37 and valve 41 to discharge.

In passing through the cake, any foreign solid matter is filtered out and the emulsion is broken and small droplets of oil coalesce into larger droplets which leave the filter cake, pass through the screen 25 and enter the separator 67. Since the cross sectional area of the separator is much larger than that of the pipe, the velocity of flow through the separator is greatly reduced and thus permits the larger drops of oil to rise and collect at the top of the separator where they are periodically drawn off through conduit 71 by opening valve 75. The water flows out of the bottom of the separator and is conducted to the discharge pipe 37. The baffle 77 prevents the formation of a vortex and also prevents a direct or shortened line of flow between inlet and the outlet.

Some of the emulsion is trapped in the filter cake and as this accumulates, the cake will lose its efficiency and the filtrate will begin to run cloudy in the glass 62. This cloud can be readily observed when the emulsion reaches a concentration of two to five parts per million.

To correct this condition applicant starts pump 45 and stops pump 1 and closes valves 9 and 41, valve 69 remains open, check valve 51 is opened by the flow from pump 45. Under these conditions sheck valve 7 will close and pump 45 will draw liquid from the separator 67 and circulate it through the filter 23 and the separator. He then fills the funnel with an oil solvent such as kerosene, No. 1 fuel oil, gasoline or any similar solvent, and simultaneously cracks valves 75 and 83. Some of the oil which has collected in the separator, or if none is present, water will be pumped out of the system and the solvent will be drawn into it and will be pumped through the filter and eventually trapped in the separator where it can be drawn off.

In passing through the filter cake, the solvent removes the emulsion which is dissolved and carried with the solvent to the separator. The ability of the cake to remove emulsion is substantially restored.

The valves 75 and 83 are closed when the solvent has all been drawn into the system and circulation may be carried on long enough to insure that the most of the solvent is collected in the separator. When this has occurred, pump 45 will be stopped, pump 1 will be started and valve 41 will be opened to start the filtrate movement. The separation of the cake from the screen necessitates the precoating of the screen again before filtering can be resumed.

To prevent the loss of the cake under such circumstances, that is during the times when the intermittently operated condensate pump is shut down, applicant permits the pump 45 to operate at all times when pump 1 is not operating and when it is desired to hold the cake in place, so that there will be differential pressure impressed on the cake at all times which serves to hold the cake on the screens. If desired, pump 45 may operate continuously.

It is, of course, necessary to match the pumps 1 and 45. As an example but not for purposes of limitation, if we assume a filter screen area of 100 square feet and that a maximum filter inlet pressure of 50 p. s. i. may be permitted before backwashing, the condensate pump 1 should be able to deliver five times the screen area in square feet or about 500 G. P. M. with an open discharge and about 200 G. P. M. at 50 pounds discharge pressure. The pump 45 should be able to deliver a quantity equal to about one-fifth the screen area in square feet at 50 p. s. i. or about 20

G. P. M. and should preferably be capable of a higher maximum pressure than pump 1 so that it will circulate liquid under any conditions. Thus, a flow of about 20 G. P. M. would be maintained through the filter even if the filter cake is at the stage where it should be cleaned or backwashed. In the event the discharge pressure of either pump exceeds that of the other, the check valve of the pump which is overcome will close to prevent flow backwards through the pump. The pump which is overcome will simply quit pumping if it is centrifugal type, or, if it is a positive displacement type, the by-pass will open and the liquid will circulate.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. The method of treating an emulsion comprising the steps of passing the emulsion through a cake of filter aid material, separating the emulsion liquids, and continuously circulating a portion of the separated continuous phase liquid through said cake.

2. In a filtration system, the combination of a closed tank, pressure-type filter having a fixed, upright, perforate means adapted to support a cake filter aid material, an inlet pipe and an outlet pipe for said filter, a receptacle connected to said outlet pipe, a conduit to supply liquid to be filtered, a first intermittently operable pump connected to said supply conduit and connected to supply said liquid to said filter inlet pipe, and a second pump, smaller than the first mentioned pump, having its suction and discharge in communication with said filter outlet and inlet pipes respectively for maintaining a pressure differential on said cake so as to hold said cake on said means, said second pump being continuously operated and having a smaller capacity than the first pump.

3. In a filtration system, the combination of a closed tank, pressure-type filter having a fixed, upright, perforate means adapted to support a cake filter aid material, an inlet pipe and an outlet pipe for said filter, a conduit to supply liquid to be filtered, a first intermittently operable pump connected to said conduit and connected to supply said liquid to said filter inlet pipe from said conduit, said first pump having a predetermined maximum discharge pressure, and a second pump, having a displacement per revolution which is less than that of the first pump, having its suction and discharge communicating with said filter outlet and inlet pipes respectively for maintaining a pressure differential on said cake so as to hold said cake on said means, said second pump having a smaller gallons per minute output capacity than the first pump and having a maximum discharge pressure which is in excess of the maximum discharge pressure of said first pump and means for maintaining said second pump in operation continuously.

4. In a filtering system, the combination of a closed tank, pressure-type filter comprising a fixed, porous medium adapted to support a cake of filter aid material, an inlet pipe and an outlet pipe for the filter, receiving means disposed to receive filtrate from said outlet pipes, a conduit to supply liquid to be filtered, a first intermittently operable pump connected to said conduit and connected to supply unfiltered liquid to said inlet pipe, a second pump, having its suction and discharge communicating with the filter outlet and inlet pipes respectively, and means including said second pump for maintaining a flow of liquid through the cake while said first pump is inoperative, to hold the cake on the medium.

LA VERN H. DE HAVEN.

REFERENCES CITED

The following references are of record in the file of this patent:

UNITED STATES PATENTS

| Number | Name | Date |
|---|---|---|
| 847,537 | Abbott | Mar. 19, 1907 |
| 1,284,750 | Munro | Nov. 12, 1918 |
| 1,501,877 | Zoul | July 15, 1924 |
| 1,579,171 | Zoul | Mar. 30, 1926 |
| 1,807,833 | Eddy | June 2, 1931 |
| 1,972,454 | Manley et al. | Sept. 4, 1934 |
| 2,073,654 | Smiley | Mar. 16, 1937 |
| 2,083,578 | Roberts | June 15, 1937 |
| 2,106,071 | Stanton | Jan. 18, 1938 |
| 2,113,010 | Tears | Apr. 5, 1938 |
| 2,128,931 | Ferris et al. | Sept. 6, 1938 |
| 2,218,547 | Novak | Oct. 22, 1940 |